US010956311B2

(12) United States Patent
Li et al.

(10) Patent No.: US 10,956,311 B2
(45) Date of Patent: **\*Mar. 23, 2021**

(54) WHITE BOX CODE CONCURRENCY TESTING FOR TRANSACTION PROCESSING

(71) Applicant: International Business Machines Corporation, Armonk, NY (US)

(72) Inventors: Li Li, Beijing (CN); Li Xiang, Beijing (CN); Chang Zhi GZ Zhang, Beijing (CN); Ting Xie, Beijing (CN); Xin Zheng, Beijing (CN); Yan Wang, Beijing (CN); Hai He, Beijing (CN); Si Bin Fan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,434

(22) Filed: Jul. 24, 2019

(65) Prior Publication Data
US 2020/0065235 A1 Feb. 27, 2020

Related U.S. Application Data

(63) Continuation of application No. 16/106,818, filed on Aug. 21, 2018, now Pat. No. 10,430,321.

(51) Int. Cl.
*G06F 11/36* (2006.01)
*G06F 16/901* (2019.01)

(52) U.S. Cl.
CPC ...... *G06F 11/3684* (2013.01); *G06F 11/3652* (2013.01); *G06F 11/3664* (2013.01);
(Continued)

(58) Field of Classification Search
CPC ............ G06F 11/3684; G06F 11/3652; G06F 11/3696; G06F 11/3664; G06F 11/3688; G06F 11/3692; G06F 16/901
(Continued)

(56) References Cited

U.S. PATENT DOCUMENTS 6,634,020 B1\* 10/2003 Bates .................... G06F 11/362
712/227
7,089,534 B2\* 8/2006 Hartman ............. G06F 11/3684
714/E11.207

(Continued)

FOREIGN PATENT DOCUMENTS

| CN | 1855068 A | 11/2006 |
|---|---|---|
| CN | 103838654 B | 1/2016 |
| WO | 2017/019113 A1 | 2/2017 |

OTHER PUBLICATIONS

Fonseca et al.; "Effective Testing for Concurrency Bugs"; Thesis for obtaining the title of Doctor of Engineering Science of the Faculties of Natural Science and Technology of Saarland University; Apr. 13, 2015; 152 pages.

(Continued)

*Primary Examiner* — Marina Lee
(74) *Attorney, Agent, or Firm* — Cantor Colburn LLP; Teddi Maranzano

(57) ABSTRACT

Provided are systems, methods, and media for concurrency conflict testing for shared resources. An example method includes identifying shared resources that are to be accessed by an application. Generating a plurality of concurrency test scenarios based on the shared resources. Analyzing a plurality of concurrency test cases to detect which concurrency test cases include a reference to the shared resources. Executing a concurrency test scenario. Performing the following while or before the concurrency test scenario is executing, obtaining analyzed concurrency test cases asso- (Continued)

ciated with the concurrency test scenario which referenced the shared resources, obtaining application modules pertaining to the obtained concurrency test cases, generating concurrency application modules by adding breakpoints to the obtained application modules, executing the obtained concurrency test cases until all of the obtained concurrency test cases are latched at the breakpoints, and simultaneously resuming the execution of the obtained concurrency test cases.

20 Claims, 12 Drawing Sheets

(52) U.S. Cl.
CPC ...... *G06F 11/3688* (2013.01); *G06F 11/3692* (2013.01); *G06F 11/3696* (2013.01); *G06F 16/901* (2019.01)

(58) Field of Classification Search
USPC .................................................. 717/124–135
See application file for complete search history.

(56) References Cited

U.S. PATENT DOCUMENTS

| | | | |
|---|---|---|---|
| 8,082,541 | B2 | 12/2011 | Pramanick et al. |
| 8,984,490 | B1 | 3/2015 | Dahan |
| 9,218,273 | B2 | 12/2015 | Bilgory et al. |
| 9,311,143 | B2 | 4/2016 | Gottschlich et al. |
| 10,055,331 | B2 | 8/2018 | Feng et al. |
| 10,176,077 | B2 * | 1/2019 | Fan ................... G06F 11/3624 |
| 10,430,321 | B1 * | 10/2019 | Li ..................... G06F 11/3664 |
| 2002/0174415 | A1 | 11/2002 | Hines |
| 2003/0028856 | A1 | 2/2003 | Apuzzo et al. |
| 2003/0037314 | A1 | 2/2003 | Apuzzo et al. |
| 2007/0283321 | A1 | 12/2007 | Hegde et al. |
| 2010/0318850 | A1 | 12/2010 | Copty et al. |
| 2012/0089873 | A1 | 4/2012 | Wang et al. |
| 2012/0143588 | A1 | 6/2012 | Liu et al. |
| 2013/0159974 | A1 | 6/2013 | Norton et al. |
| 2014/0344785 | A1 | 11/2014 | Bilgory et al. |
| 2015/0309847 | A1 | 10/2015 | Aggarwal et al. |
| 2016/0124838 | A1 | 5/2016 | Feng et al. |
| 2018/0232297 | A1 * | 8/2018 | Fan ..................... G06F 11/362 |
| 2018/0322029 | A1 | 11/2018 | Feng et al. |
| 2020/0065235 | A1 * | 2/2020 | Li ..................... G06F 11/3688 |

OTHER PUBLICATIONS

Li et al., "White Box Code Concurrency Testing for Transaction Processing"; U.S. Appl. No. 16/106,818, filed Aug. 21, 2018.

List of IBM Patents or Patent Applications Treated As Related; Date Filed: Jul. 24, 2019, 2 pages.

Mell et al.; "The NIST Definition of Cloud Computing—Recommendations of the National Institute of Standards and Technology"; U.S. Department of Commerce—National Institute of Standards and Technology; Sep. 2011; 7 pages.

Wang et al.; "Coverage Guided Systematic Concurrency Testing"; ICSE '11 Proceedings of the 33rd International Conference on Software Engineering; May 21-28, 2011; 10 pages.

Yu et al.; "DESCRY: Reproducing System-Level Concurrency Failures"; ESEC/FSE'17, Paderborn, Germany; Sep. 4-8, 2017; 11 pages.

* cited by examiner

| Comp ID | Resource ID | Res Type | Access Point | Access Type |
|---|---|---|---|---|
| Comp 1 | Resource A | Locker | Line XXX | Read |
| Comp 2 | Resource B | Memory Var | Line YYY | Write |
| ... | ... | ... | ... | ... |

| Module Name | Module ID | Resource ID | Break Point |
|---|---|---|---|
| Comp A | AAM | Resource A | Break point m |
| Comp B | BAP | Resource A | Break point p |

*FIG. 8*

WHITE BOX CODE CONCURRENCY TESTING FOR TRANSACTION PROCESSING

DOMESTIC PRIORITY

This application is a continuation of U.S. Pat. No. 10,430,321B1, issued on Oct. 1, 2019 and titled "WHITE BOX CODE CONCURRENCY TESTING FOR TRANSACTION PROCESSING", the contents of which are incorporated by reference herein in its entirety.

BACKGROUND

The present invention generally relates to concurrent programming, and more specifically, to white box concurrency testing for transaction processing in a concurrent computing environment.

In computer science, concurrency refers to the ability of different parts or units of a program, algorithm, or computer problem to be executed out-of-order or in partial order, without affecting a final outcome. Concurrency bugs often occur during the developing phase of software development. Concurrency bugs can cause serious functionality issues such as causing system and/or application runs to hang or crash. Concurrency bugs can be difficult to identify, reproduce, and correct via known technology. Development time, computational resources, and memory storage is affected if the detection of concurrency bugs is delayed to a later phase.

A root cause of concurrency bugs is multiple threads attempting to access a shared resource. Example shared resources can include but are not limited to data structures, common memory variables, locks, sockets, services, blocks of memory, database access, data chains, file accesses, and/or suitable shared resources.

SUMMARY

Embodiments of the present invention provide a computer-implemented method for concurrency conflict testing for shared resources of an application. A non-limiting example of the computer-implemented method includes identifying, by a system comprising one or more processors, shared resources that are to be accessed by one or more components of the application. The method includes generating, by the system, a plurality of concurrency test scenarios based on the shared resources. The method includes analyzing, by the system, a plurality of concurrency test cases to detect which concurrency test cases of the plurality of concurrency test cases include a reference to the shared resources. The method includes executing, by the system, a concurrency test scenario of the plurality of concurrency test scenarios. The method includes performing the following while or before the concurrency test scenario is executing, obtaining the analyzed concurrency test cases associated with the concurrency test scenario which referenced the shared resources, obtaining application modules pertaining to the obtained concurrency test cases, generating concurrency application modules for the obtained concurrency test cases by adding breakpoints to the obtained application modules such that the obtained concurrency test cases are each paused before the shared resources are accessed by the obtained concurrency test cases, executing the obtained concurrency test cases until all of the obtained concurrency test cases are latched at the breakpoints, and simultaneously resuming the execution of the obtained concurrency test cases to simulate real concurrent access testing for the shared resources.

Embodiments of the present invention provide a system for concurrency conflict testing for shared resources of an application. The system includes one or more processors that are configured to perform a method. A non-limiting example of the method includes identifying, by the system, shared resources that are to be accessed by one or more components of the application. The method includes generating, by the system, a plurality of concurrency test scenarios based on the shared resources. The method includes analyzing, by the system, a plurality of concurrency test cases to detect which concurrency test cases of the plurality of concurrency test cases include a reference to the shared resources. The method includes executing, by the system, a concurrency test scenario of the plurality of concurrency test scenarios. The method includes performing the following while or before the concurrency test scenario is executing, obtaining the analyzed concurrency test cases associated with the concurrency test scenario which referenced the shared resources, obtaining application modules pertaining to the obtained concurrency test cases, generating concurrency application modules for the obtained concurrency test cases by adding breakpoints to the obtained application modules such that the obtained concurrency test cases are each paused before the shared resources are accessed by the obtained concurrency test cases, executing the obtained concurrency test cases until all of the obtained concurrency test cases are latched at the breakpoints, and simultaneously resuming the execution of the obtained concurrency test cases to simulate real concurrent access testing for the shared resources.

Embodiments of the invention provide a computer program product for concurrency conflict testing for shared resources of an application, the computer program product comprising a computer readable storage medium having program instructions embodied therewith. The program instructions are executable by a system comprising one or more processors to cause the system to perform a method. A non-limiting example of the method includes identifying, by the system, shared resources that are to be accessed by one or more components of the application. The method includes generating, by the system, a plurality of concurrency test scenarios based on the shared resources. The method includes analyzing, by the system, a plurality of concurrency test cases to detect which concurrency test cases of the plurality of concurrency test cases include a reference to the shared resources. The method includes executing, by the system, a concurrency test scenario of the plurality of concurrency test scenarios. The method includes performing the following while or before the concurrency test scenario is executing, obtaining the analyzed concurrency test cases associated with the concurrency test scenario which referenced the shared resources, obtaining application modules pertaining to the obtained concurrency test cases, generating concurrency application modules for the obtained concurrency test cases by adding breakpoints to the obtained application modules such that the obtained concurrency test cases are each paused before the shared resources are accessed by the obtained concurrency test cases, executing the obtained concurrency test cases until all of the obtained concurrency test cases are latched at the breakpoints, and simultaneously resuming the execution of the obtained concurrency test cases to simulate real concurrent access testing for the shared resources.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram illustrating an example shared resource access repository in accordance with one or more embodiments of the present invention;

FIG. 8 depicts a block diagram illustrating an example concurrency application module repository in accordance with one or more embodiments of the present invention;

Figure 1:
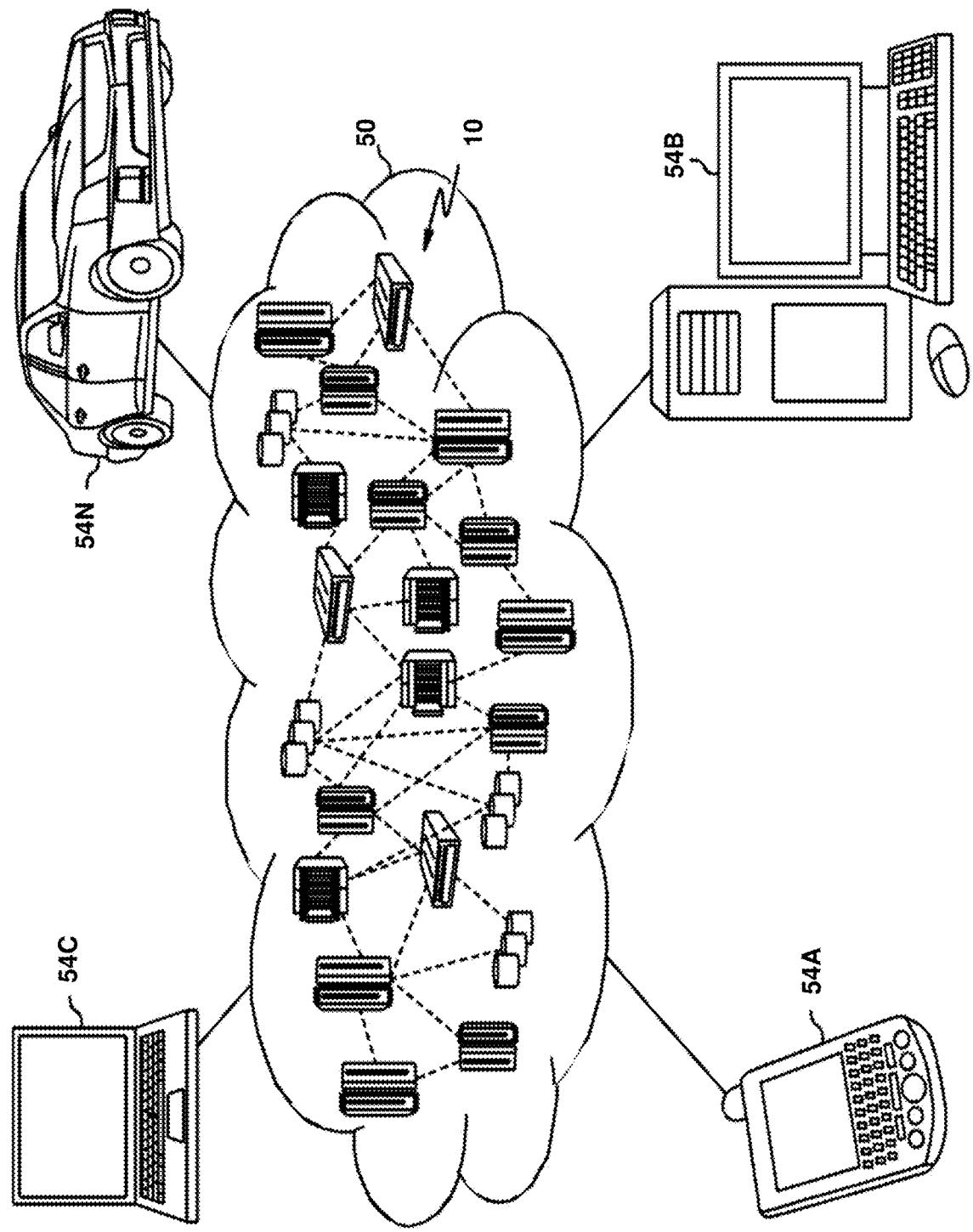
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
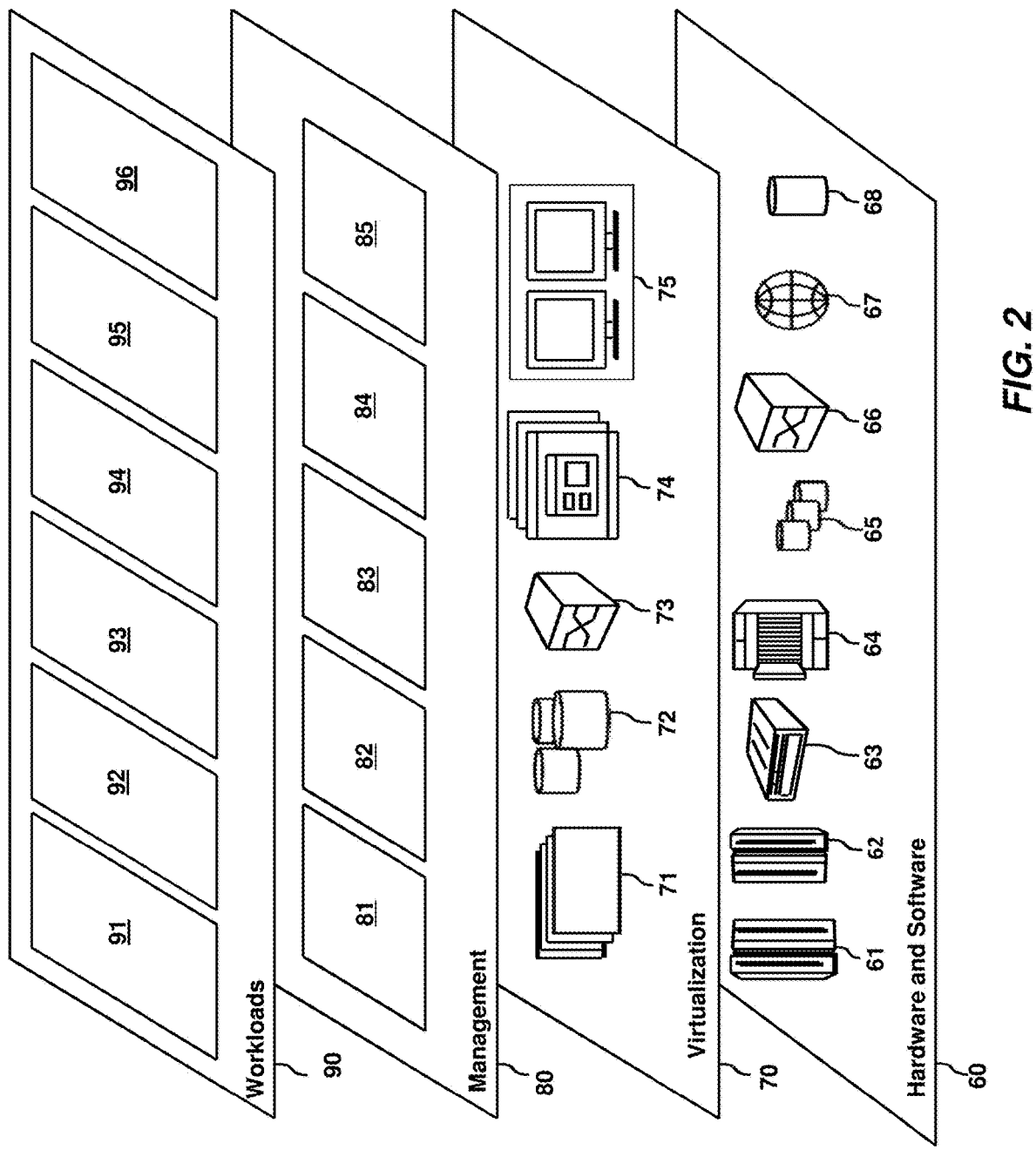
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conflict testing processing 96.

Turning now to an overview of technologies that are more specifically relevant to aspects of the invention, as noted above, concurrency refers to the ability of different parts or units of a program, algorithm, or computer problem to be executed out-of-order or in partial order, without affecting a final outcome. Concurrency bugs often occur during the developing phase of software development. Concurrency bugs can cause serious functionality issues such as causing system and/or application runs to hang or crash. Concurrency bugs can be difficult to identify, reproduce, and correct via known technology. Development time, computational resources, and memory storage is affected if the detection of concurrency bugs is delayed to a later phase. A root cause of concurrency bugs is multiple threads attempting to access a shared resource. Example shared resources can include, but are not limited to data structures, common memory variables, locks, sockets, services, blocks of memory, database access, data chains, file accesses, and/or suitable shared resources.

In general, a test case is a set of conditions or variables under which a tester determines if a requirement upon an application is partially or fully satisfied. For example, in some embodiments of the present invention, a test case includes a set of input values, execution preconditions, expected results, and an executed post condition, in which the test case is developed to cover a certain test condition. As used herein, a test case refers to, but is not limited to, a Functional Verification Test (FVT). Scenario testing is a testing procedure that can be utilized to confirm, among other things, that end-to-end functioning of software is working correctly under certain use cases. A test scenario can be associated with one or more test cases, thus a scenario can have multiple test cases.

"White box testing" is a testing technique which evaluates code and internal structure of an application. White box testing often involves looking at the structure of the code. White Box testing can be used to test coverage of the specification of the code such as for example, code coverage, segment coverage, data flow testing, path testing, loop testing etc. A component is the lowest unit of an application. An application often includes a combination and/or integration of many individual modules (e.g., segments of code). In some embodiments of the present invention, the modules and/or units are tested independently (e.g., unit testing). Each module receives an input, processes the input, and generates an output. The output is then validated against an expected output.

Traditionally, performing testing is performed by quality assurance (QA) testers through the use of large value data to prepare test cases and input data. Software developers attempt to avoid concurrency bugs by doing code review through the use of unit testing (UT) and FVT. However, various problems may stem from the use of the above approaches. For example, UT processes often cannot cover all scenarios involving concurrency accessing of shared resources. For example, UT processes often cannot cover situations where shared resources are distributed in different components and/or features, and/or where shared resources are implemented by more than one team. Code reviewers are unable to identify all test scenarios for complex applications and systems using such methods. UT processes normally focus on a specific functionality and scenario. Traditional test cases are unable to accurately cover full shared resources scenarios because the test cases encapsulate whole functionality and cannot be broken down and tested.

FVT process can have similar coverage issues because concurrency accessing of shared resources is transparent to testers during the FVT phase. Another method of detecting concurrency bugs is through the performance of performance load testing. However, computing costs of load testing may be high and load testing may take a long time to run. As performance load testing is implemented in a late stage of the development, process, the cost of diagnosis and fixing such bugs is increased in comparison to the cost of correcting the bugs at an earlier phase.

Turning now to an overview of the aspects of the invention, one or more embodiments of the invention address the above-described shortcomings of the prior art by providing a system that identifies all the shared resources, actively analyzes, and determines concurrency test scenarios for the shared resources. As used herein, a currency test scenario refers to, but is not limited to, a test scenario for one or more shared resource(s), for example, a currency test scenario 1 may be for a shared resource A, whereas a currency test scenario 2 may be for the shared resources A & B, etc. In some embodiments of the present invention, the system analyzes test cases using a FVT process and then builds up relationships between the test cases and the concurrency test scenarios. While executing a given concurrency test scenario, qualified test cases for the concurrency test scenario will be picked up by the system and breakpoints are set to modules associated with the test cases. After the test cases are latched by the breakpoints, all the test cases will be unlatched simultaneously by the system to resume execution of the concurrency test scenario to detect any potential conflicting or broken simultaneous shared resource accesses by multiple test cases.

The above-described aspects of the invention address the shortcomings of the prior art by allowing for increased coverage of concurrency test scenarios for shared resources, detecting concurrency bugs in the earliest phase of development and testing, finding and locating bugs more accurately, reproducing concurrency bugs more regularly, providing a more stable product (e.g., software application or service), and/or saving time and cost for software users and software vendors.

Figure 3:
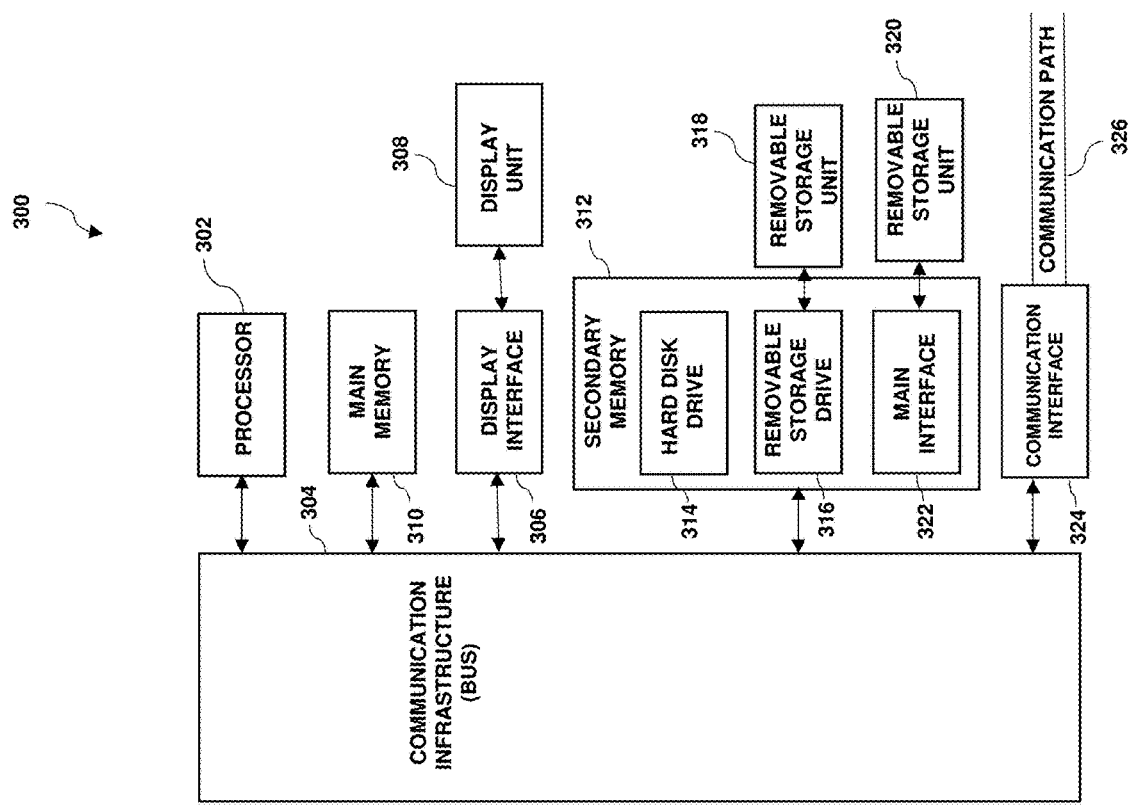
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
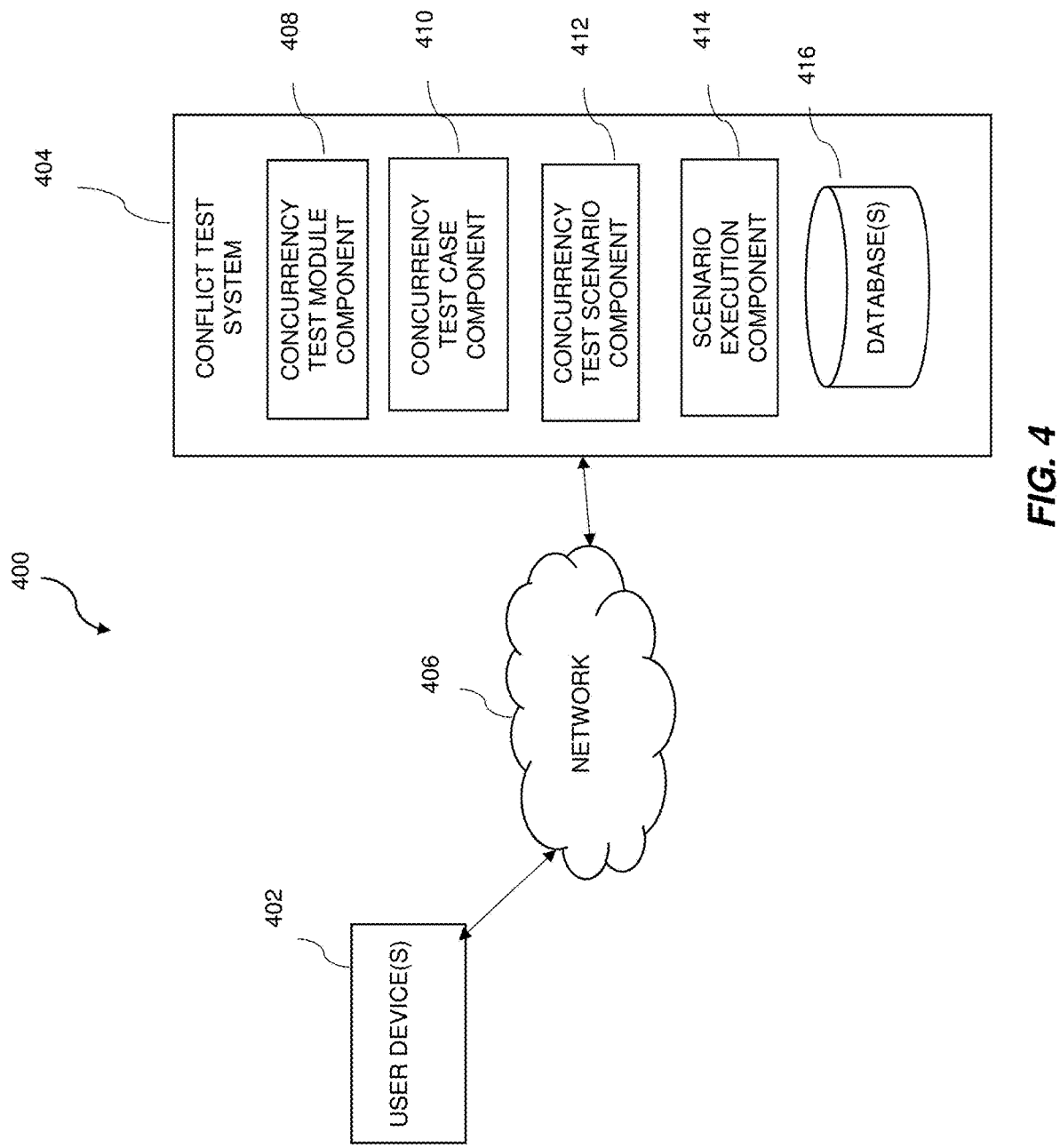
FIG. 4 depicts an example distributed environment for concurrency conflict testing for shared resources accessing by an application in accordance with one or more embodiments of the present invention.

Referring now to FIG. 4, an example distributed environment 400 is presented for concurrency conflict testing for shared resources accessing by an application. Distributed environment 400 a conflict test system 404, and in some embodiments of the present invention includes one or more user devices 402, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. For example, in some embodiments of the present invention, distributed environment 400 does not include one or more user devices 402.

Conflict test system 404 includes a concurrency application module component 408, a concurrency test case component 410, a concurrency test scenario component 412, a scenario execution component 414, and one or more databases 416. In some embodiments of the present invention, concurrency application module component 408, concurrency test case component 410, concurrency test scenario component 412, scenario execution component 414, and/or databases 416 are interconnected via a communication infrastructure 304 and/or communication path 326. Conflict test system 404 may have internal and external hardware components, such as those depicted and described above with respect to FIG. 3. As used herein, a currency application module refers to, but is not limited to, an application module that is generated based on an application module, in which includes the concurrency application module includes added break point code to allow for test cases to be stopped before the shared resource accessing.

In some embodiments of the present invention, conflict test system 404 forms part of a multithreaded computer system operating in a concurrent programming environment. In general, in concurrent programming environments, a set of processes may be executed on one or more processors (e.g., processor 302). A process refers to a unit of concurrent programming (e.g., a program or section of a program). Multiple processes may execute the same section of the program simultaneously and each process may, in turn, include multiple threads. A process thread refers to a sub-element of a process or a stream of instructions simultaneously executed within the same program. In concurrent programming, a multithreading processing technique may be employed that enables two or more of the same type of transaction to be carried out simultaneously. Each stream processes a different transaction message.

In some embodiments of the present invention, conflict test system 404 is a standalone computing device, a management server, a web server, a mobile computing device, or other suitable electronic device and/or computing system capable of receiving, sending, and processing data. In some embodiments of the present invention, conflict test system 404 is a server computing system utilizing multiple computers, such as in cloud computing environment 50 (FIG. 1). In some embodiments of the present invention, conflict test system 404 is a laptop computer, a tablet computer, a netbook computer, a personal computer (PC), a desktop computer, a personal digital assistant (PDA), a smartphone, or other suitable programmable electronic device capable of communicating with user device 402, and other computing devices (not shown) within distributed environment 400 via network 406. In some embodiments of the present invention, conflict test system 404 is a computing system utilizing clustered computers and components (e.g., database server computers, application server computers, etc.) that act as a single pool of seamless resources that are accessible within distributed environment 400. Conflict test system 404 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals, including multimedia signals that include voice, data, and video information. In general, network 406 can be any suitable combination of connections and protocols that can support communications between user device 402, conflict test system 404, and/or other computing devices (not shown) within a distributed environment 400. In some embodiments of the present invention, distributed environment 400 is implemented as part of a cloud computing environment such as cloud computing environment 50 (FIG. 1).

User device 402 is configured to allow users to send and/or receive information from user device 402 to conflict test system 404, which in turn allows users to access concurrency application module component 408, concurrency test case component 410, concurrency test scenario component 412, scenario execution component 414, and database(s) 416. In some embodiments of the present invention, user device 402 includes a user interface (UI) that is configured to present to the user the results of the concurrency conflict testing (e.g., displaying results via a display screen, audible message via a speaker, etc.).

In some embodiments of the present invention, user device 402 is a laptop computer, a tablet computer, a netbook computer, a personal computer (PC), a desktop computer, a personal digital assistant (PDA), a smartphone, an internet-of-things (IoT) enabled device, and/or other suitable programmable electronic devices capable of communicating with various components and devices within distributed environment 400. In some embodiments of the present invention, user device 402 is a programmable electronic mobile device or a combination of programmable electronic mobile devices capable of executing machine-readable program instructions and communicating with other computing devices (not shown) within distributed environment 400. In some embodiments of the present invention, user device 402 may include internal and external hardware components, such as those depicted and described above with respect to FIG. 3.

In the example depicted in FIG. 4, conflict test system 404 is configured to identify shared resources that are to be accessed by one or more components of an application and to generate a plurality of concurrency test scenarios based on the shared resources (e.g., via concurrency test scenario component 412). Conflict test system 404 is configured to obtain and analyze a plurality of concurrency test cases to detect which concurrency test cases of the plurality of concurrency test cases include one or more references to the shared resources. Conflict test system 404 then builds relationships between the plurality of concurrency test scenarios and the plurality of concurrency test cases to identify which concurrency test cases are associated with which concurrency test scenarios (e.g., via concurrency test case component 410). In some embodiments of the present invention, the building of the relationships includes analyzing the plurality of concurrency test cases via application of a function verification test (FVT) process. Conflict test system 404 is configured to execute one or more concurrency test scenarios of the plurality of concurrency test scenarios, in which the concurrency test scenarios are executed one at a time (e.g., via scenario execution component 414). For each concurrent test scenario that is being executed, conflict test system 404 is configured to obtain analyzed concurrency test cases that include references to the shared resources, in which the obtained concurrency test cases are from the concurrency test cases which are associated with the concurrent test scenario. Conflict test system 404 is further configured to obtain application modules pertaining to the obtained concurrency test cases and to generate concurrency application modules for the obtained concurrency test cases (e.g., via concurrency application module component 408). The generating of the concurrency application modules includes adding breakpoints to the obtained application modules such that the obtained concurrency test cases are each paused before the shared resources are accessed by the obtained concurrency test cases. Conflict test system 404 is configured to execute the obtained concurrency test cases until all of the obtained concurrency test cases are latched at the breakpoints. After the obtained concurrency test cases are latched, conflict test system 404 is configured to resume the execution of the obtained concurrency test cases simultaneously to simulate real concurrent access testing for the shared resources. This process is repeated for each of the one or more concurrency test scenarios.

In some embodiments of the present invention, after executing the concurrency test scenario, conflict test system 404 is configured to check whether the concurrency test scenario is valid. In some embodiments of the present invention, conflict test system 404 is configured to filter the concurrency test scenario in response to detecting that the concurrency test scenario is invalid and then executing a second concurrency test scenario of the plurality of concurrency test scenarios.

In some embodiments of the present invention, the simulating of the real concurrency access testing for the shared resources includes conflict test system 404 detecting, based on the execution of the concurrency test scenario, at least one concurrency bug. In some embodiments of the present invention, the at least one concurrency bug includes at least one deadlock bug, atomicity-violation bug, or order-violation bug. In some embodiments of the present invention, the simulating of the real concurrent access testing for the shared resources further includes conflict test system 404 transmitting an electronic alert to a user (e.g., via user device 402) in response to detecting the at least one concurrency bug.

Figure 5:
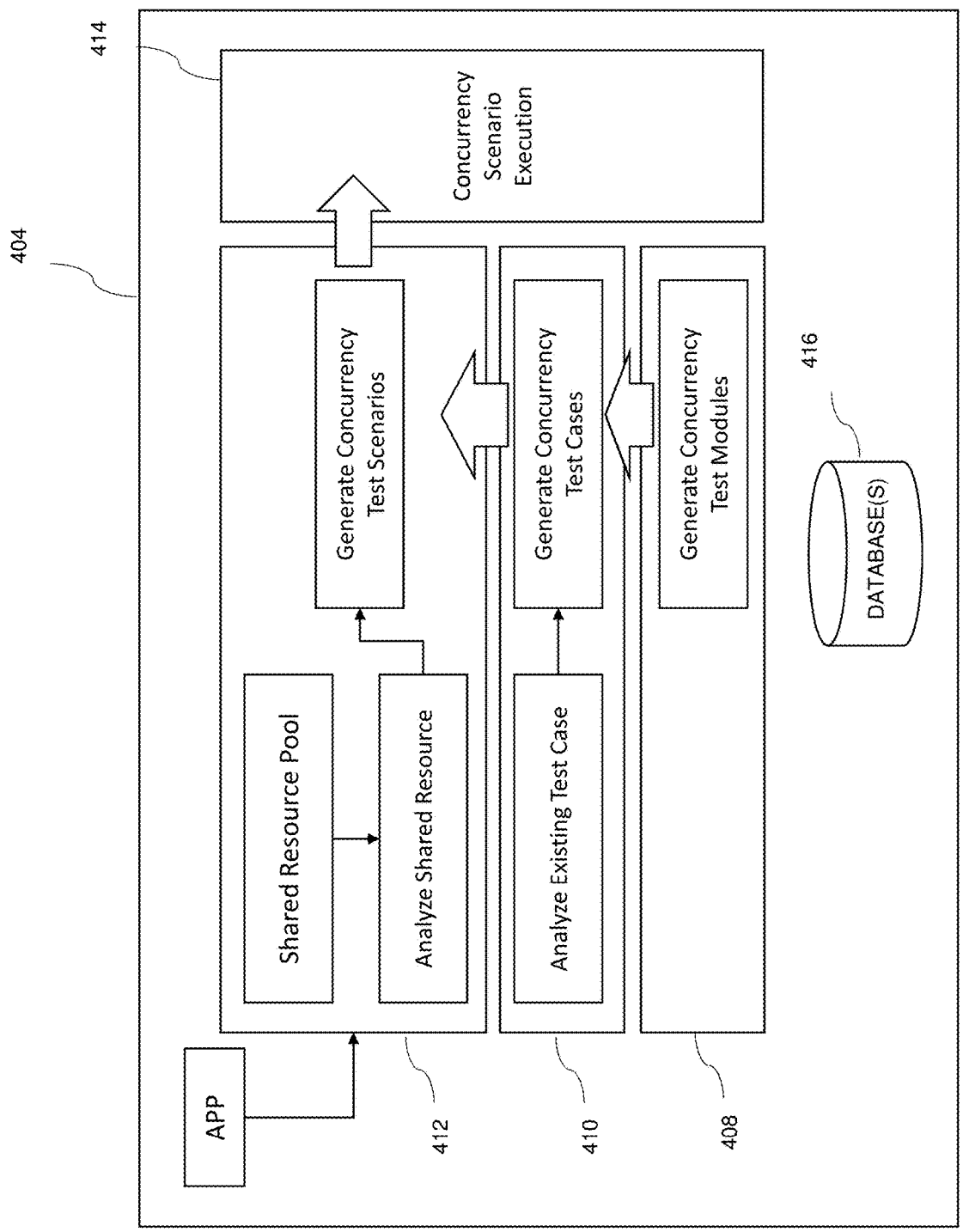
FIG. 5 depicts a block diagram illustrating an example architecture of a conflict test system in accordance with one or more embodiments of the present invention

FIG. 5 depicts an example architecture 500 of conflict test system 404 in accordance with one or more embodiments of the present invention. In some embodiments of the present invention, concurrency test scenario component 412 is configured to utilize a shared resource pool to identify and/or obtain shared resources that will be accessed by one or more components of an application. In some embodiments of the present invention, the application is executed within the conflict test system 404. In some embodiments of the present invention, the application is executed within a user device (e.g., user device 402). In some embodiments of the present invention, concurrency test scenario component 412 is configured to analyze the shared resources and to generate concurrency test scenarios based on the shared resources. In some embodiments of the present invention, database 416 and/or concurrency test scenario component 412 includes a shared resource access repository and a concurrent test scenario repository. In some embodiments of the present invention, the shared resources are identified by scanning source code of the application and then the identified shared resources are stored in the shared resource access repository.

FIG. 6 illustrates an example of shared resource access repository 600 in accordance with one or more embodiments of the present invention. In some embodiments of the present invention, shared resource access repository 600 includes one or more tables that store information pertaining to shared resources that have been identified as being accessed by one or more components of a particular application. In some embodiments of the present invention, shared resource access repository 600 relates a component identification (ID) to: a resource ID, a resource type, an access point, and/or an access type. In some embodiments of the present invention, the component ID is an alphanumeric identifier that is unique to each component of an application. In some embodiments of the present invention, the resource ID is an alphanumeric identifier that is unique to a shared resource that is to be accessed by a particular component of the application. In some embodiments of the present invention, the resource type describes what type of resource is associated with a particular resource ID and with a particular component ID. For example, in some embodiments of the present invention, the resource types supported by shared resources access repository 600 includes a locker, memory, variable, and/or other suitable resource types as known to those having ordinary skill in the art. In some embodiments of the present invention, the access point identifies a particular line where a particular component will be accessing a particular resource. In some embodiments of the present invention, the access type identifies whether the particular access is a read type access or a write type access.

Referring back to FIG. 5, before and/or during execution of the concurrency testing scenario, concurrency test case component 410 is configured to pick up relevant existing test cases that are available and/or to create new test cases to generate one or more concurrency test cases. In some embodiments of the present invention, database 416 and/or concurrency test case component 410 includes a common test case repository and a concurrency test case repository, in which the common test case repository stores test cases that are analyzed by concurrency test case component 410. The concurrency test case repository store the concurrency test cases that are generated by the concurrency test case component 410.

Figure 7:
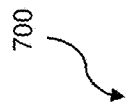
FIG. 7 depicts a block diagram illustrating an example concurrency test case repository in accordance with one or more embodiments of the present invention.

FIG. 7 illustrates an example concurrency test case repository 700 in accordance with one or more embodiments of the present invention. In some embodiments of the present invention, concurrency test case repository 700 comprises one or more tables that store concurrency test cases that are generated by concurrency test case component 410. In some embodiments of the present invention, concurrency test case repository 700 relates a test case ID to a component ID, input resources, and to an expected output. In some embodiments of the present invention, the expected output establishes what is expected to be returned from execution of a particular test case associated with a particular component and combination of input resources.

Referring back to FIG. 5, concurrency application module component 408 is configured to generate concurrency application modules for each concurrency test scenario before and/or during execution of a concurrency test scenario, in which the concurrency application modules are generated by fetching application modules of the generated concurrency test cases and then setting breakpoints in the fetched application modules such that the concurrency test cases of the concurrency test scenario can be paused before the shared resource(s) accessing. In some embodiments of the present invention, database 416 and/or concurrency application module component 408 includes a common application module repository and a concurrency test model repository, in which the common model case repository stores the application modules that are used to generate the concurrency application modules, in which the generated concurrency application modules are stored in the concurrency application module repository.

FIG. 8 illustrates an example concurrency application module repository 800 in accordance with one or more embodiments of the present invention. In some embodiments of the present invention, concurrency application module repository 800 comprises one or more tables that store concurrency application modules that are generated by the concurrency application module component 408. In some embodiments of the present invention, concurrency application module repository 800 relates a module name to a module ID, a resource ID, and to a breakpoint location. The module ID is an alphanumeric identifier that uniquely identifies a particular module.

Figure 9:
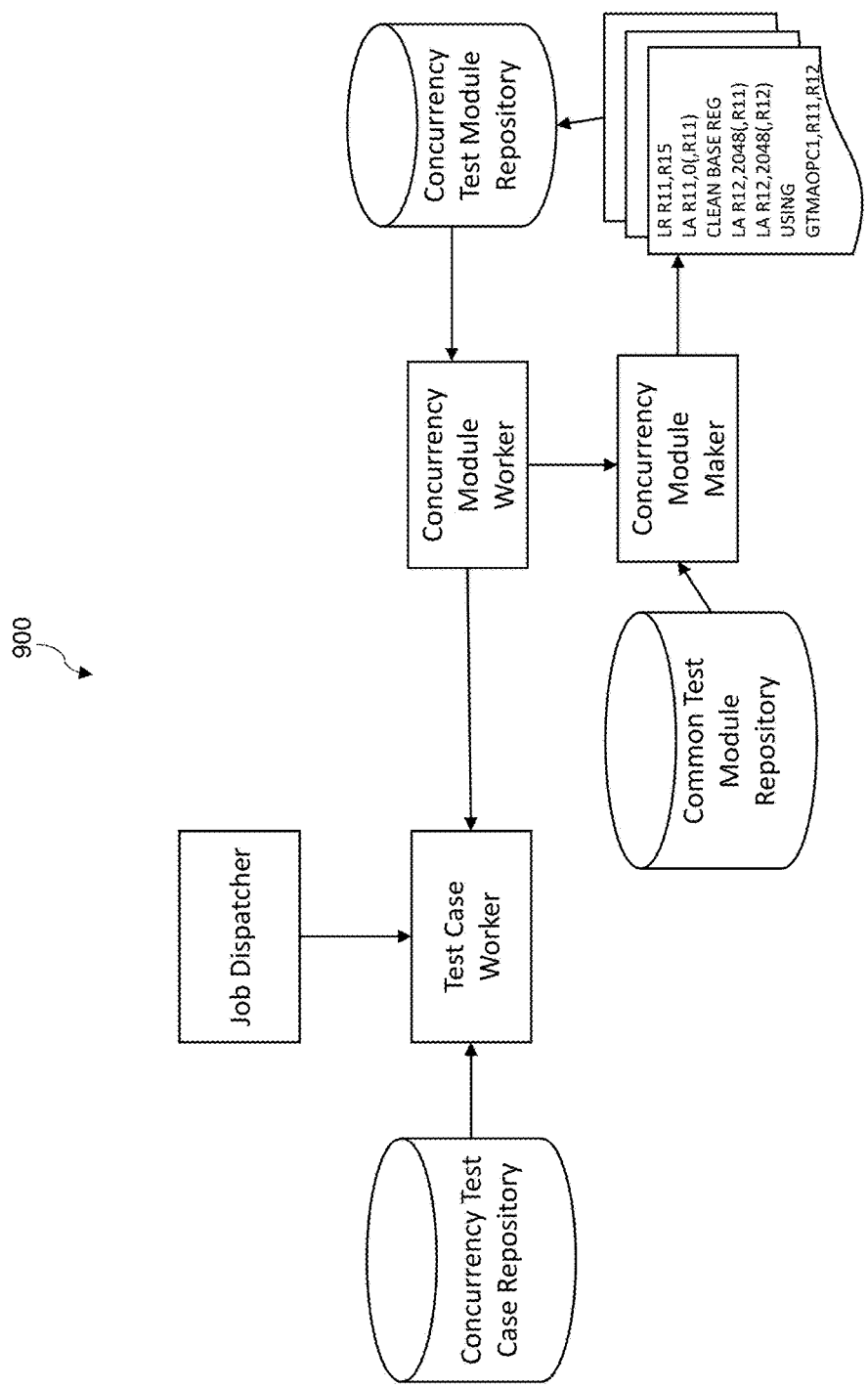
FIG. 9 depicts a block diagram illustrating an example architecture of a concurrency application module component in accordance with one or more embodiments of the present invention.

FIG. 9 illustrates an example architecture 900 of the concurrency application module component 408 in accordance with one or more embodiments of the present invention. In some embodiments of the present invention, concurrency application module component 408 includes a concurrency module maker, a concurrency module worker, a common application module repository, and a concurrency application module repository (e.g., concurrency application module repository 800). In some embodiments of the present invention, the concurrency module maker is configured to obtain preexisting application modules from the common application module repository and to generate concurrency application modules from the preexisting application modules. Concurrency module marker generates the concurrency application module by adding breakpoints to the preexisting application modules, which can let the application modules pause and resume before shared resources are accessed. The concurrent module worker is configured to identify concurrency application modules that are relevant to a particular test case of a particular test scenario. The concurrent module worker passes the identified concurrency application modules to a test case worker that is used for executing a particular concurrency test scenario.

Figure 10:
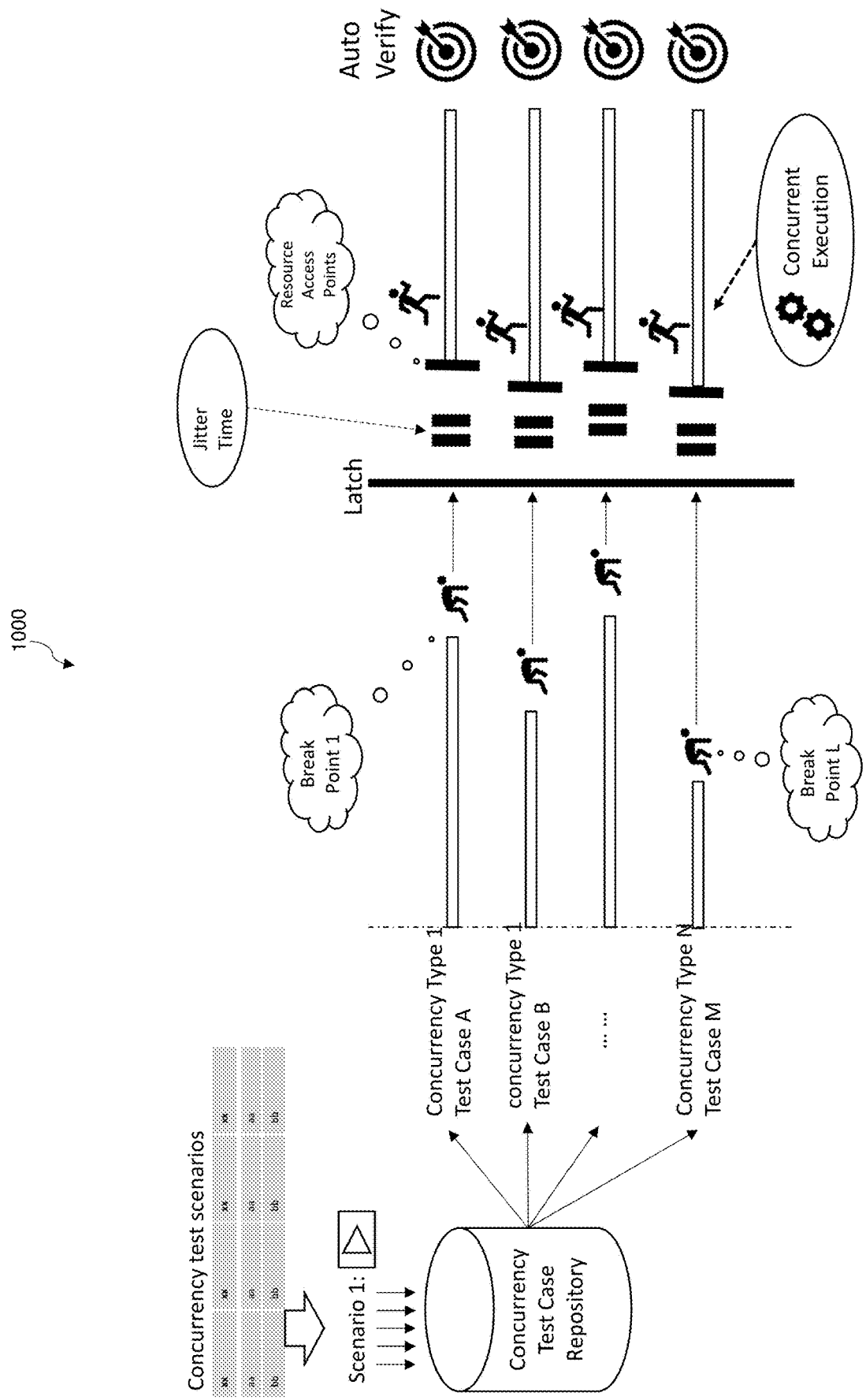
FIG. 10 depicts a block diagram illustrating an example architecture of a scenario execution component in accordance with one or more embodiments of the present invention.

Referring back to FIG. 5, scenario execution component 414 is configured to launch the test cases together and pause the test cases in accordance with breakpoints prior to the test cases calling the shared resources. After all the test cases are latched by the breakpoints, scenario execution component 414 unlatches all the test cases simultaneously to resume execution of the concurrency testing scenario to detect any potential conflicts or broken simultaneous shared resource accesses by multiple test cases of the concurrency test scenario. FIG. 10 illustrates an example architecture 1000 of scenario execution component 414 for running a concurrency test scenario in accordance with one or more embodiments of the present invention. Architecture 1000 illustrates a plurality of test cases that have breakpoints at various locations. The test cases are latched prior to each test case accessing a shared resource. After the test cases are latched, all the test cases are concurrently executed and automatically verified. In some embodiments of the present invention, jitter time is added to or one or more test cases.

Figure 11:
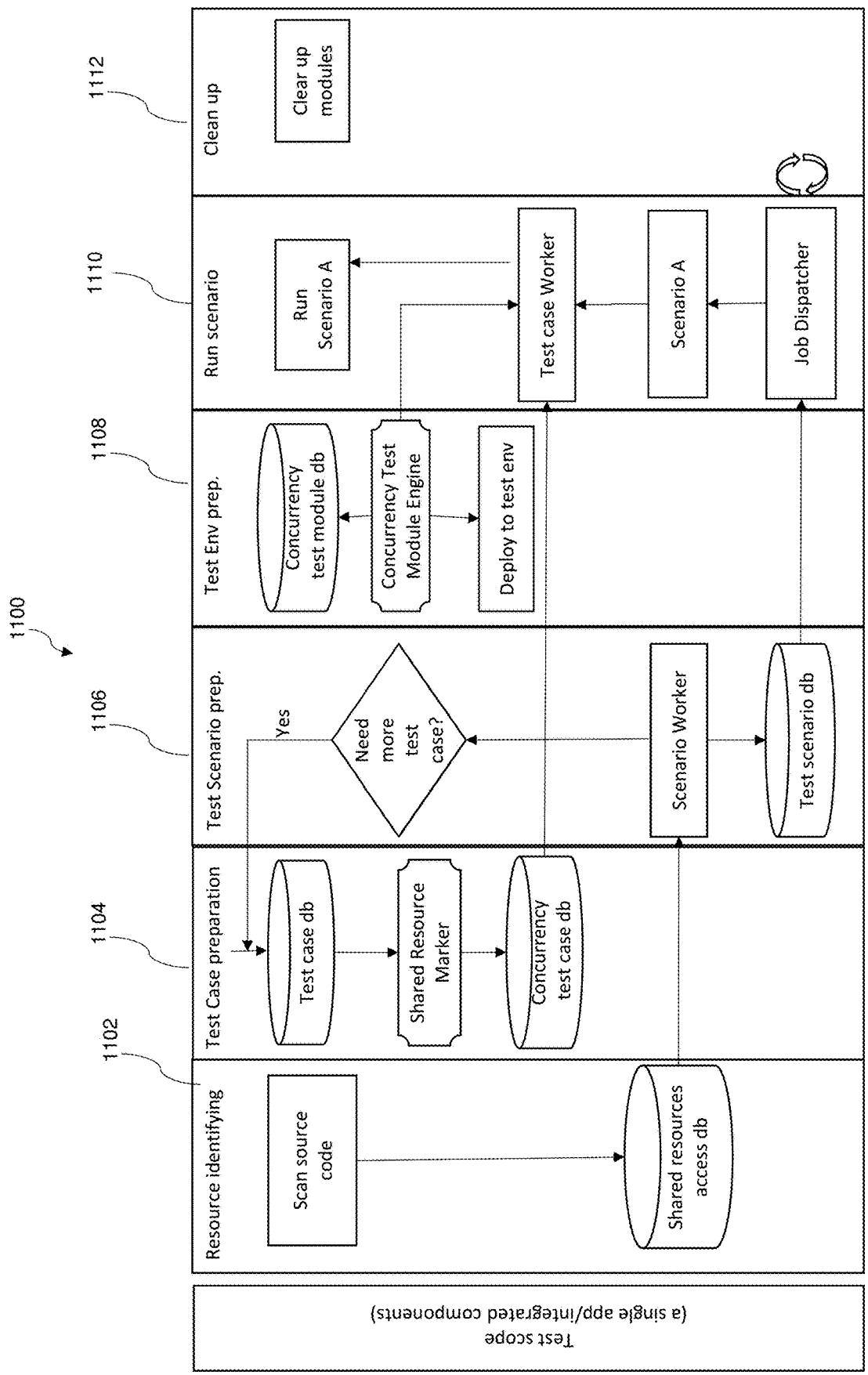
FIG. 11 depicts a flow diagram illustrating an example concurrency testing workflow according to one or more embodiments of the present invention.

FIG. 11 depicts a flow diagram illustrating an example concurrency testing workflow 1100 according to one or more embodiments of the present invention. In some embodiments of the present invention, concurrency testing workflow 1100 includes a shared resource identification phase 1102, a test case preparation phase 1104, a test scenario preparation phase 1106, a test environment preparation phase 1108, a scenario run phase 1110, and a cleanup phase 1112. In some embodiments of the present invention, the shared resource identification phase 1102 includes scanning source code of an application and/or source code of integrated components of the application to identify shared resources that are to be accessed. The identified shared resources are then stored in a shared resources access database. In some embodiments of the present invention, the test scenario preparation phase 1106 includes a scenario worker that analyzes the shared resources of the shared resources repository and then generates a concurrency test scenario that is to be stored in a concurrent test scenario repository. In some embodiments of the present invention, the test case preparation phase 1104 includes analyzing preexisting test cases from a test case repository and building up relationships between the concurrency test scenarios and concurrency test cases to identify which concurrency test cases are associated with which concurrency test scenarios. The shared resources are then marked in accordance with their relationships. The test environment preparation phase 1108 includes a concurrency application module engine (e.g., concurrency application module component 408) that obtains concurrency application modules from the concurrency application module repository. A test environment is then deployed based on the concurrency application modules. The scenario run phase 1110 includes a job dispatcher that selects a particular scenario from the concurrency test scenario database, a test case worker then identifies concurrency test cases that are associated with the selected concurrency test scenario based on the buildup relationships (e.g., via the established markings). The concurrency test scenario is then executed in accordance with the breakpoints that were set based on the concurrency application modules. The job dispatcher selects and runs another scenario until all the concurrent test scenarios have been executed. The cleanup phase 1112 includes clearing the concurrence application modules that were utilized during the execution of the concurrency test scenarios.

Figure 12:
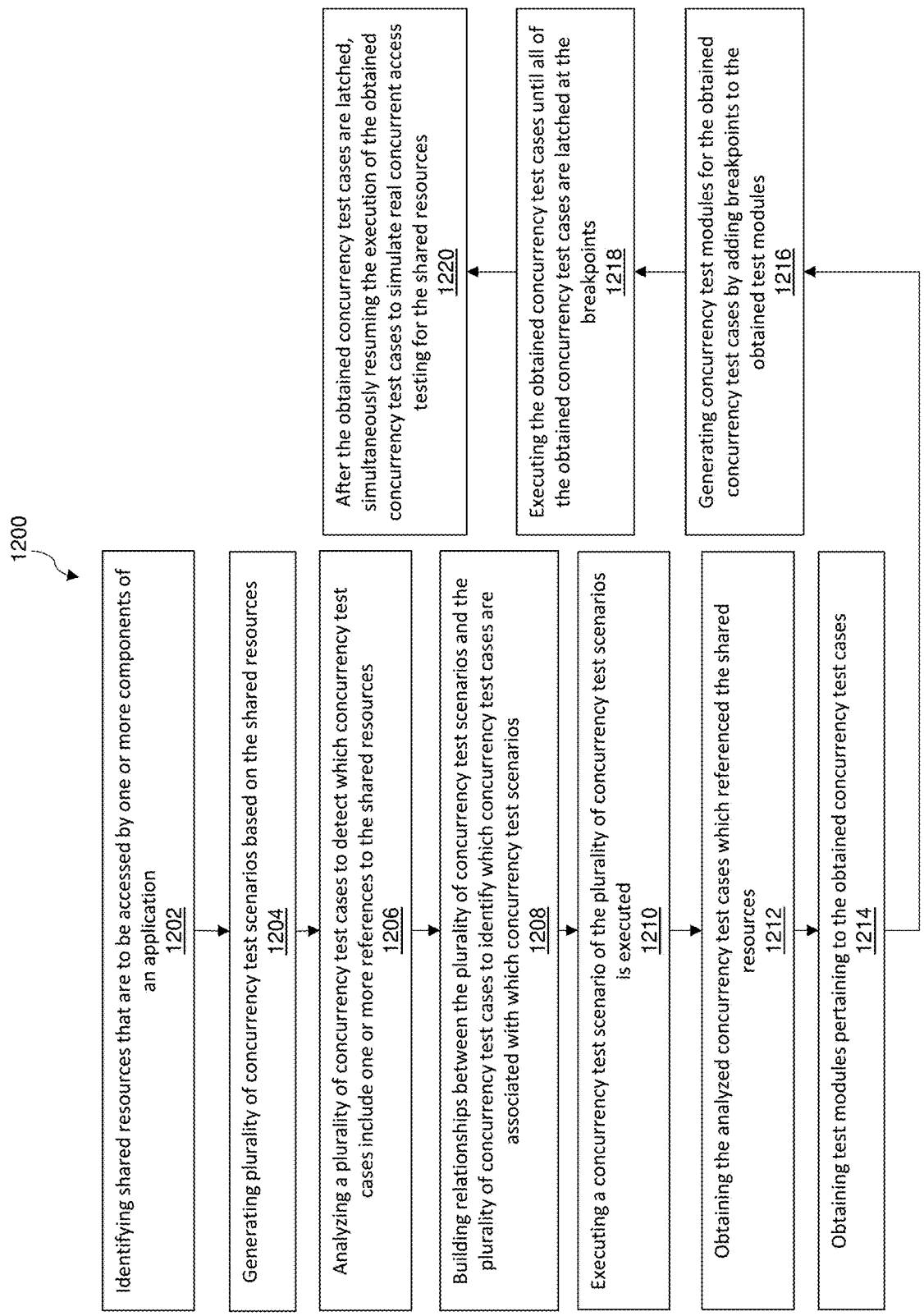
FIG. 12 depicts a flow diagram illustrating a methodology in accordance with one or more embodiments of the present invention.

Additional details of the operation of the conflict test system 404 will now be described with reference to FIG. 12, wherein FIG. 12 depicts a flow diagram illustrating a methodology 1200 according to one or more embodiments of the present invention. At 1202, shared resources that are to be accessed by one or more components of an application are identified. At 1204, a plurality of concurrency test scenarios based on the shared resources are generated. At 1206, a plurality of concurrency test cases are analyzed to detect which concurrency test cases of the plurality of concurrency test cases include one or more references to the shared resources. In some embodiments of the present invention, the plurality of concurrency test cases that are analyzed are obtained fetching a plurality of existing test cases, analyzing the plurality of existing test cases, and generating the concurrency test cases by matching the existing test cases with shared resource accessing. At 1208, relationships between the plurality of concurrency test scenarios and the plurality of concurrency test cases are built up to identify which concurrency test cases are associated with which concurrency test scenarios. In some embodiments of the present invention, the building of the relationships includes analyzing the plurality of concurrency test cases by applying a function verification test (FVT) process. At 1210, a concurrency test scenario of the plurality of concurrency test scenarios is executed. At 1212, while the concurrency test scenario is executing, analyzed concurrency test cases are obtained which referenced the shared resources. Further, while the concurrency test scenario is executing, at 1214 application modules pertaining to the obtained concurrency test cases are obtained. Further while the concurrency test scenario is executing, at 1216 concurrency application modules for the obtained concurrency test cases are generated, in which the concurrent application modules are generated by adding breakpoints to the obtained application modules such that the obtained concurrency test cases are each paused before the shared resources are accessed by the obtained concurrency test cases. Further, while the concurrency test scenario is executing, at 1218 the obtained concurrency test cases are executed until all of the obtained concurrency test cases are latched at the breakpoints. After the obtained concurrency test cases are latched, at 1220, the execution of the obtained concurrency test cases are simultaneously resumed to simulate real concurrent access testing for the shared resources.

In some embodiments of the present invention, methodology 1200 further includes, after executing the concurrency test scenario, checking whether the concurrency test scenario is valid, filtering the concurrency test scenario in response to detecting that the concurrency test scenario is invalid, and executing a second concurrency test scenario of the plurality of concurrency test scenarios.

In some embodiments of the present invention, the simulating of the real concurrent access testing for the shared resources includes detecting, based on the execution of the concurrency test scenario, at least one concurrency bug, in which the at least one concurrency bug includes at least one deadlock bug, atomicity-violation bug, or order-violation bug. In some embodiments of the present invention, the simulating of the real concurrent access testing for the shared resources further includes transmitting an electronic alert to a user in response to detecting the at least one concurrency bug.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for concurrency conflict testing for shared resources of an application, the method comprising:
    identifying, by a system comprising one or more processors, the shared resources that are to be accessed by one or more components of the application;

generating, by the system, a plurality of concurrency test scenarios based on the shared resources;
analyzing, by the system, a plurality of concurrency test cases to detect which concurrency test cases of the plurality of concurrency test cases include a reference to the shared resources;
executing, by the system, a concurrency test scenario of the plurality of concurrency test scenarios; and
while the concurrency test scenario is executing:
obtaining the analyzed concurrency test cases which referenced the shared resources, wherein the obtained concurrency test cases are associated with the concurrency test scenario;
obtaining application modules pertaining to the obtained concurrency test cases; and
generating concurrency test modules for the obtained concurrency test cases by adding breakpoints to the obtained application modules such that the obtained concurrency test cases are each paused before the shared resources are accessed by the obtained concurrency test cases.

2. The computer-implemented method of claim 1 further comprising:
after executing the concurrency test scenario, checking whether the concurrency test scenario is valid;
filtering the concurrency test scenario in response to detecting that the concurrency test scenario is invalid; and
executing a second concurrency test scenario of the plurality of concurrency test scenarios.

3. The computer-implemented method of claim 1 further comprising:
detecting, based on the execution of the concurrency test scenario, at least one concurrency bug, wherein the at least one concurrency bug includes at least one dead lock bug, atomicity-violation bug, or order-violation bug; and
transmitting an electronic alert to a user in response to detecting the at least one concurrency bug.

4. The computer-implemented method of claim 1, wherein the shared resources are identified by scanning source code of the application, wherein the identified shared resources are stored in a resource access repository of a database, wherein the resource access repository relates a component ID to at least one of a resource ID, a resource type, an access point, or an access type.

5. The computer-implemented method of claim 1, wherein the generated concurrency application modules are stored in a concurrency application module repository stored in a database, wherein the concurrency application module repository relates a module name to a module ID, a resource ID, and to a breakpoint.

6. The computer-implemented method of claim 1, wherein the concurrency test cases are obtained from a concurrency test case repository stored in a database, wherein the concurrency test case repository relates a test case ID to a component ID, two or more resources, and to an expected output.

7. The computer-implemented method of claim 1 further comprising:
building, by the system, relationships between the plurality of concurrency test scenarios and the plurality of concurrency test cases to identify which concurrency test cases are associated with which concurrency test scenarios by applying a function verification test (FVT) process.

8. A computer program product for concurrency conflict testing for shared resources of an application, the computer program product comprising a computer readable storage medium having program instructions embodied therewith, the program instructions executable by a system comprising one or more processors to cause the system to perform a method, the method comprising:
identifying, by the system, the shared resources that are to be accessed by one or more components of the application;
generating, by the system, a plurality of concurrency test scenarios based on the shared resources;
analyzing, by the system, a plurality of concurrency test cases to detect which concurrency test cases of the plurality of concurrency test cases include a reference to the shared resources;
executing, by the system, a concurrency test scenario of the plurality of concurrency test scenarios; and
while the concurrency test scenario is executing:
obtaining the analyzed concurrency test cases which referenced the shared resources, wherein the obtained concurrency test cases are associated with the concurrency test scenario;
obtaining application modules pertaining to the obtained concurrency test cases; and
generating concurrency application modules for the obtained concurrency test cases by adding breakpoints to the obtained application modules such that the obtained concurrency test cases are each paused before the shared resources are accessed by the obtained concurrency test cases.

9. The computer program product of claim 8, wherein the method further includes:
after executing the concurrency test scenario, checking whether the concurrency test scenario is valid;
filtering the concurrency test scenario in response to detecting that the concurrency test scenario is invalid; and
executing a second concurrency test scenario of the plurality of concurrency test scenarios.

10. The computer program product of claim 8, wherein the method further includes:
detecting, based on the execution of the concurrency test scenario, at least one concurrency bug, wherein the at least one concurrency bug includes at least one dead lock bug, atomicity-violation bug, or order-violation bug; and
transmitting an electronic alert to a user in response to detecting the at least one concurrency bug.

11. The computer program product of claim 8, wherein the shared resources are identified by scanning source code of the application, wherein the identified shared resources are stored in a resource access repository of a database, wherein the resource access repository relates a component ID to at least one of a resource ID, a resource type, an access point, or an access type.

12. The computer program product of claim 8, wherein the generated concurrency application modules are stored in a concurrency application module repository stored in a database, wherein the concurrency application module repository relates a module name to a module ID, a resource ID, and to a breakpoint.

13. The computer program product of claim 8, wherein the concurrency test cases are obtained from a concurrency test case repository stored in a database wherein the concurrency test case repository relates a test case ID to a component ID, two or more resources, and to an expected output.

14. The computer program product of claim 8, wherein the method further includes:
   building, by the system, relationships between the plurality of concurrency test scenarios and the plurality of concurrency test cases to identify which concurrency test cases are associated with which concurrency test scenarios by applying a function verification test (FVT) process.

15. A system for concurrency conflict testing for shared resources of an application, the system comprising one or more processors configured to perform a method, the method comprising:
   identifying, by the system, the shared resources that are to be accessed by one or more components of the application;
   generating, by the system, a plurality of concurrency test scenarios based on the shared resources;
   analyzing, by the system, a plurality of concurrency test cases to detect which concurrency test cases of the plurality of concurrency test cases include a reference to the shared resources;
   executing, by the system, a concurrency test scenario of the plurality of concurrency test scenarios; and
   while the concurrency test scenario is executing:
      obtaining the analyzed concurrency test cases which referenced the shared resources, wherein the obtained concurrency test cases are associated with the concurrency test scenario;
      obtaining application modules pertaining to the obtained concurrency test cases; and
      generating concurrency application modules for the obtained concurrency test cases by adding breakpoints to the obtained application modules such that the obtained concurrency test cases are each paused before the shared resources are accessed by the obtained concurrency test cases.

16. The system of claim 15, wherein the method further includes:
   after executing the concurrency test scenario, checking whether the concurrency test scenario is valid;
   filtering the concurrency test scenario in response to detecting that the concurrency test scenario is invalid; and
   executing a second concurrency test scenario of the plurality of concurrency test scenarios.

17. The system of claim 15, wherein the method further includes:
   detecting, based on the execution of the concurrency test scenario, at least one concurrency bug, wherein the at least one concurrency bug includes at least one dead lock bug, atomicity-violation bug, or order-violation bug; and
   transmitting an electronic alert to a user in response to detecting the at least one concurrency bug.

18. The system of claim 15, wherein the shared resources are identified by scanning source code of the application, wherein the identified shared resources are stored in a resource access repository of a database, wherein the resource access repository relates a component ID to at least one of a resource ID, a resource type, an access point, or an access type.

19. The system of claim 15, wherein the generated concurrency application modules are stored in a concurrency application module repository stored in a database, wherein the concurrency application module repository relates a module name to a module ID, a resource ID, and to a breakpoint.

20. The system of claim 15, wherein the method further includes:
   building, by the system, relationships between the plurality of concurrency test scenarios and the plurality of concurrency test cases to identify which concurrency test cases are associated with which concurrency test scenarios by applying a function verification test (FVT) process.

* * * * *